(12) United States Patent
Baker

(10) Patent No.: US 6,485,225 B1
(45) Date of Patent: Nov. 26, 2002

(54) BARRIER APPARATUS HAVING MAGNETIC COMPONENTS

(76) Inventor: Joseph Peter William Baker, 18 Huntsman's Meadow, Ascot, Berkshire (GB), SL5 7PF ( * ) Notice: Subject to any disclaimer, the term of this patent is extended or adjusted under 35 U.S.C. 154(b) by 0 days.

(21) Appl. No.: 09/857,390

(22) PCT Filed: Dec. 10, 1999

(86) PCT No.: PCT/GB99/04199

§ 371 (c)(1),
(2), (4) Date: Jun. 5, 2001

(87) PCT Pub. No.: WO00/35068

PCT Pub. Date: Jun. 15, 2000

(30) Foreign Application Priority Data

Dec. 10, 1998 (GB) .............................. 9827241

(51) Int. Cl.$^7$ ................................. E01F 13/00
(52) U.S. Cl. .................. 404/6; 49/34; 49/49; 160/331; 160/332
(58) Field of Search ....................... 404/6, 9, 10; 49/34, 49/49, 95, 404; 160/330, 331, 332

(56) References Cited

U.S. PATENT DOCUMENTS

| | | | | |
|---|---|---|---|---|
| 484,572 | A | * 10/1892 | Rudert | ........................ 49/132 |
| 1,832,812 | A | * 11/1931 | Keenan | ........................ 246/127 |
| 2,207,148 | A | * 7/1940 | Hall | ............................ 160/189 |
| 5,245,787 | A | * 9/1993 | Swenson et al. | ............... 404/9 |
| 5,624,203 | A | * 4/1997 | Jackson et al. | .......... 246/473.1 |
| 5,823,705 | A | * 10/1998 | Jackson et al. | ................ 404/6 |
| 5,829,912 | A | * 11/1998 | Marcotullio et al. | ........... 404/6 |
| 6,135,190 | A | * 10/2000 | Gompertz et al. | .......... 160/328 |
| 6,192,627 | B1 | * 2/2001 | Gompertz et al. | .......... 160/330 |
| 6,349,503 | B1 | * 2/2002 | Gompertz et al. | ............. 49/34 |

FOREIGN PATENT DOCUMENTS

| | | | |
|---|---|---|---|
| DE | 34 25 071 | * | 1/1986 |
| JP | 05231487 | * | 9/1993 |
| JP | 05340455 | * | 12/1993 |

* cited by examiner

Primary Examiner—Gary S. Hartmann
(74) Attorney, Agent, or Firm—Martin Fleit; Paul D. Bianco; Fleit Kain Gibbons Gutman & Bongini

(57) ABSTRACT

Throughway barrier apparatus comprises a pair of housings (51, 52; 151, 152) to be sited one to each side of a throughway (58). Each housing is provided with an upstanding surface (53, 54) of magnetic material, the two surfaces (53, 54) facing one another. A movable device (65) is magnetically coupled to each upstanding surface, and drive means (60) are arranged to move the magnetically coupled device upwardly and downwardly of the surface (53, 54). A barrier element such as a chain, cable, boom or the like extends across the throughway (58), the barrier element (55; 155a, 155b) being in use connected to the two said movable devices (65) for movement therewith. Each said movable device (65) comprises a magnetic body (15) which has an outer cylindrical surface and radial end walls, is magnetically polarized axially of the cylindrical surface, and has a disc-like pole plate (14, 16) at each radial end of the cylindrical surface, the two disc-like pole plates (14, 16) having a like diameter greater than the diameter of the cylindrical surface. Each motor unit (62) is provided with a drive shaft (18) of square or other non-circular cross-section that is a loose fit within a bore (13) of like crosssectional shape extending through the magnetic body (15) of the movable device (65).

10 Claims, 5 Drawing Sheets

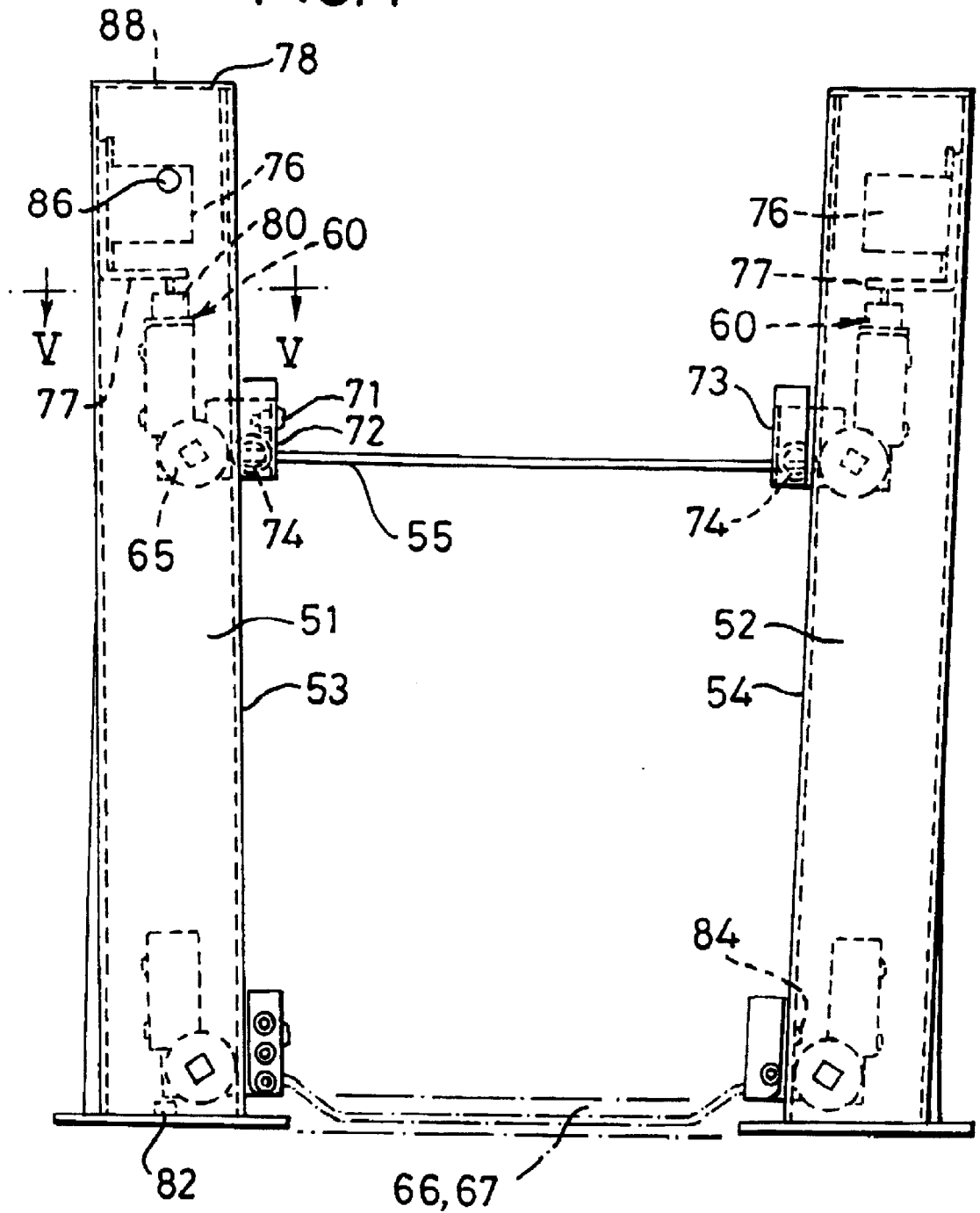

BARRIER APPARATUS HAVING MAGNETIC COMPONENTS

TECHNICAL FIELD

This invention relates to barrier apparatus for a passageway or throughway, be it an internal or external roadway for vehicles or an internal or external pathway for pedestrians.

BACKGROUND ART

Roadway barrier apparatus is known which comprises a barrier element in the form of a chain extending across the roadway between a pair of vertically slotted housings, one to each side of the roadway. One housing contains a drive mechanism which comprises a drum-like pulley rotatably driven by the output shaft of a reduction-geared motor that is positionally fixed at or near the base of the housing, one end of the chain being coiled around the drum. The apparatus further comprises, adjacent the top of the one housing, a positionally fixed pulley wheel over which the chain passes before traversing the roadway and being secured to an anchor point located inside the opposite housing and adjacent its top. When the motor is operated to wind in the chain about the drum, the barrier element adopts a raised position in which it extends across the roadway between the two housings, and its exposed length is commensurate with the distance between the two housings. As the motor is operated to unwind the chain and to lower its exposed part to a slack position or relaxed condition, the length of the exposed part of the chain is increased until (most of) it lies loosely over the surface of the roadway—or, possibly in a channel cut in the roadway to accommodate it. However in this relaxed condition, or as it approaches it, the chain adopts a curved path in the vicinity of the arris between each housing and the roadway, and it can be easily deflected and damaged by or cause damage to passing vehicles or, if used as a barrier apparatus for a pedestrian pathway, cause pedestrians to trip and fall and/or cause injury to them. Such difficulties or disadvantages are not fully overcome even if the roadway is provided with a channel to accommodate the chain. Furthermore if such a channel is provided, it can in any event give rise to additional problems associated with the collection therein of water, dirt and debris.

It is therefore considered desirable to provide throughway barrier apparatus which can overcome the above-mentioned and/or other difficulties or problems associated with the prior art.

SUMMARY OF THE INVENTION

According to one aspect of this invention there is provided throughway barrier apparatus comprising: a pair of housings to be sited one to each side of a throughway, each housing being provided with an upstanding surface of magnetic material; a movable device including a magnetic body which is magnetically coupled to the upstanding surface and which has a cylindrical surface in rolling contact with the upstanding surface; and drive means to move the magnetically coupled device upwardly and downwardly of the surface; and further comprising: a barrier element to extend across the throughway, the barrier element being in use connected to the two said movable devices for movement therewith.

Preferably the barrier element is a flexible element, e.g. chain, cable or the like.

It will be appreciated that the length of the barrier element between the two devices is thus kept substantially constant as the two devices and the barrier element move up and/or down, and there is no substantial change in the element's effective length.

Preferably each movable device and its associated drive means is provided internally of a respective said housing, a coupling unit in use connects between an associated said movable device and an adjacent end of the barrier element, said coupling unit including a member to extend through an upstanding elongate aperture (e.g. a slot) in said upstanding surface.

Preferably each drive means comprises a motor unit movable together with said movable device.

Advantageously, each motor unit has a counterweighting mechanism associated therewith to provide a countering load to at least the weight of the movable motor unit.

Preferably each said movable device comprises a magnetic body which (a) has radial end walls at opposed ends of said outer cylindrical surface, (b) is magnetically polarised axially of the cylindrical surface, and (c) has a disc-like pole plate at each radial end of the cylindrical surface, the two disc-like pole plates having a like diameter greater than the diameter of the cylindrical surface.

Advantageously each motor unit is provided with a drive shaft (preferably of square or other non-circular cross-section) that is a loose fit within a bore of like cross-sectional shape extending through the magnetic body of said movable device.

BRIEF DESCRIPTION OF THE DRAWINGS

By way of example embodiments of this invention will now be described with reference to the accompanying drawings of which:

FIG. 4 is a diagrammatic side view of a second embodiment of apparatus according to this invention.

DETAILED DESCRIPTION OF EXAMPLES OF THE INVENTION

Figure 1:
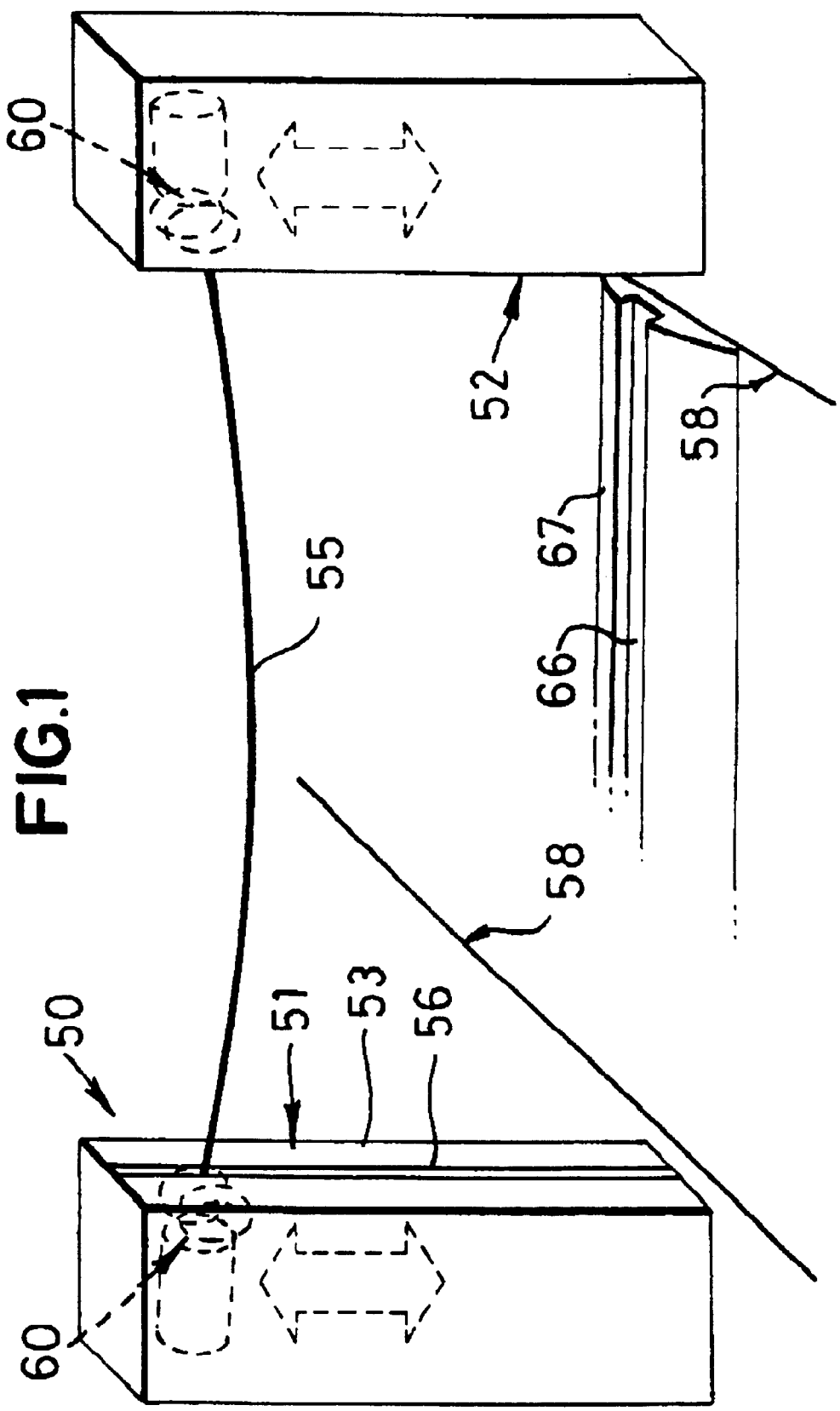
FIG. 1 is a schematic perspective view of apparatus according to a first embodiment of the invention.
Figure 2:
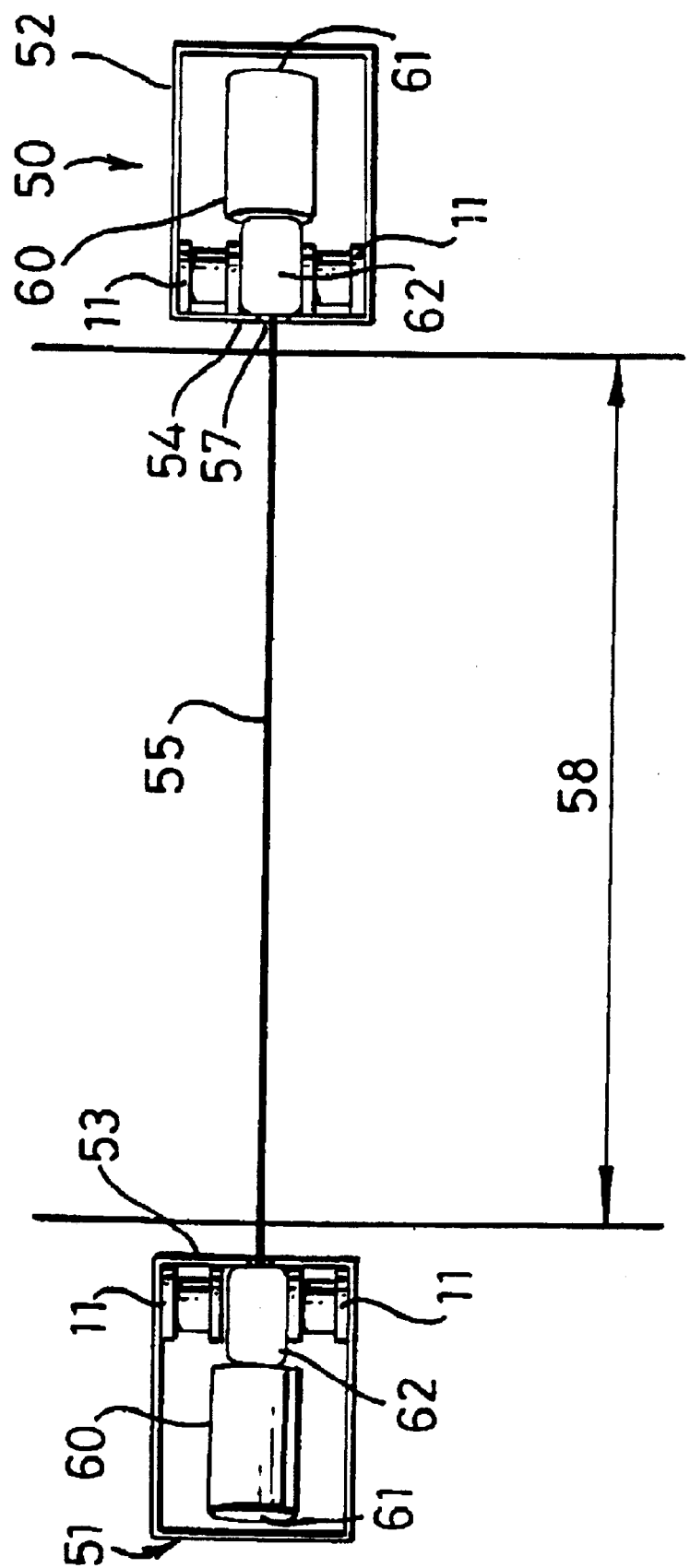
FIG. 2 is a horizontal cross-sectional view of the apparatus shown in FIG. 1.

The barrier system 50 illustrated in FIGS. 1 and 2 comprises a pair of hollow steel bollards 51, 52 of generally rectangular horizontal cross-section disposed one to each side of a roadway (or other passageway or throughway) 58, the mutually facing upright walls 53, 54 of the bollards being of vertical planar form and each having a vertical slot 56, 57 therein. A barrier element 55 extends through the slots 56, 57 and across the roadway. The barrier element 55 may be a steel link chain, high tensile steel cable, boom or the like. Each of the two ends of the element 55 are attached to the casing of an associated movable drive device 60 located within a respective one of the hollow bollards 51, 52.

In one form of this embodiment, each movable drive device 60 is supported for movement upwardly and downwardly within an associated bollard 51, 52 by a cable passing over a fixed upper pulley to a counterweight matching the weight of the device 60 plus approximately half the weight of the barrier element 55.

Each device 60 comprises an electric motor 61 coupled via a bevel-gear or worm drive gearbox 62 having an output gear shaft 17. The output drive shaft of each gearbox 62 extends in opposite directions perpendicular to and away from the output shaft of the associated motor 61. A pair of rotary motion translation devices 65 are mounted on the opposed ends of the output drive shaft 17 each gearbox 62. In a preferred arrangement, each motor 61 has a 33 watt power rating, and the gearbox 62 coupled thereto has a 33:1 gear ratio to provide an output rotation speed of 60 rpm for the rotary devices 65.

Figure 3:
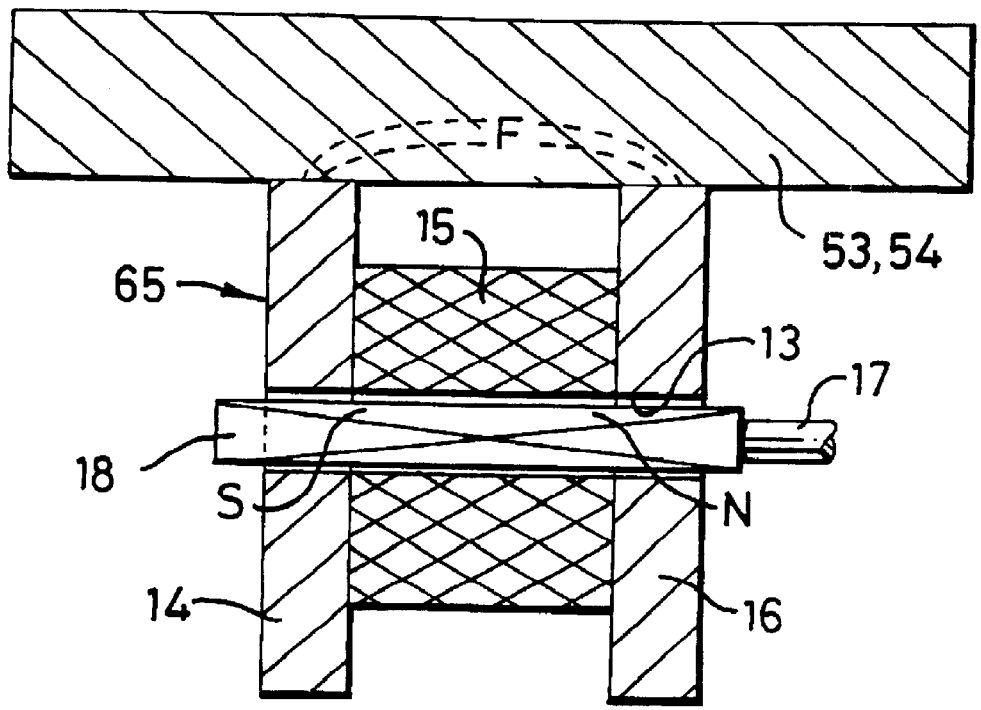
FIG. 3 is a cross-sectional view of a detail shown in FIGS. 1 and 2.

As best shown in FIG. 3, each of the four rotary motion translation devices 65 (two within the hollow bollard/pillar 51 and two within the hollow bollard/pillar 52) comprises an annular body 15 of magnetic material that is polarised axially with a North (seeking) pole N at one radial end and a South (seeking) pole S at the opposite radial end. The body 15 has an axial bore 13 therethrough and a pair of disc-like steel washers 14, 16 are mounted on an axial stub adaptor 18 fastened to drive shaft 17 and extending through the bore 13. Bore 13 is of non-circular, preferably square, cross-section, and the axial adaptor 18—in use providing the rotational drive to the body 15—is of a correspondingly-shaped cross-section and made of brass or other suitable high reluctance or non-magnetic material.

The two washers 14, 16 are identically dimensioned and are each of greater diameter than the outer diameter of the annular body 15 and thus form annular pole plates for the magnetic body 15. The difference in diameter can be substantially smaller than that illustrated, e.g. of the order of 1 or 2 mm, and the washers 14, 16 can be of any desired thickness sufficient to redirect the flux from each end of the magnetic body 15 towards the periphery of the adjacent washer.

Optionally and preferably, with a square cross-sectional shape, the bore'side dimension is marginally greater—e.g. 1 mm to 2 mm preferably 1.4 mm) than the side dimension of the axial adaptor 18 that transmits drive thereto and such as to permit the body to tilt or slew to a limited degree. The clearance provided by this dimensional difference allows the end pole pieces 14, 16 in use to maintain physical contact with the bollard walls 53, 54 notwithstanding surface imperfections or variations in stiction between cooperating parts, and this ability to cope with a slightly uneven running surface serves to maximise efficiency of the transmitted drive.

In one preferred embodiment the washers 14, 16 are each 6 mm thick and 75 mm in diameter, and the bore through body 15 and washers 14, 16 is of square cross=section having a nominally 24 mm side dimension to pass loosely or with clearance over a square-section axial adaptor 18 of 22.6 mm (⅞ inch) side dimension.

Each of the two rotary motion translation devices 65 within a bollard 51, 52 is thus magnetically coupled, rollingly, to the magnetically permeable steel interior surface of associated bollard wall 53, 54 and this magnetic coupling is assisted by the resultant force directed generally laterally and downwardly due to the weight of the barrier element. When (in each bollard) the two roller-like bodies 15 are rotated in a common direction about their respective axes by the brass adaptors 18 mounted on the opposed ends of output shaft 17 of the gearbox 62, they effect a linear translation of the combined motor 61, gearbox 62 and device 65 with respect to the associated wall 53, 54 by creating a low reluctance path F for the magnetic flux between the pole plates 14, 16. The positionally fixed wall 53, 54 thus acts much in the manner of a keeper or pole shoe for the poles of each magnetic coupling device 60.

It will also be appreciated that the two motors 61 are electrically interconnected to operate together and either (a) effect counter-rotation, in one sense, of the two pairs of devices 65 to cause them to travel upwardly from a lowered position and raise with them the counterweighted motors 61 and the opposite ends of the cable 55 attached to them, or (b) effect counter-rotation, in an opposite (second) sense, of the two pairs of devices 65 to cause them to travel downwardly from a raised position and lower with them the counterweighted motors 61 and the opposite ends of the cable 55 attached to them—which does not substantially relax its tension or substantially increase in length.

Optionally each motor assembly may be held in its raised upper position by an electromagnet.

It will be further appreciated that if a car should ride over a partly-lowered cable 55, little or no damage is likely to arise since there is no geared or keyed coupling between each drive device 60 and its associated surface 53 or 54, and the magnetic frictional coupling that is present can be readily overcome in such a circumstance to permit slipping between these magnetically coupled surfaces. In addition, because each drive assembly 60 is retained in place by virtue of magnetic attraction (and the tension in cable 55 due to its own weight), and without mechanical fixtures, each unit 60 may be easily removed for servicing or repair. In a modification, a single roller device 65 may be provided in each housing 51, 52 (instead of a pair).

In another modification, particularly appropriate with a single roller device 65, the ends of the cable 55 are formed into a loop or joined to a collar and that loop or collar encompasses the roller body 15 of the device 65.

With either said modification, the rolling washers or discs 14, 16 may be frusto-conical or part-spherical to provide shaped peripheries that are angled or curved (instead of cylindrical), these shaped peripheries engaging walls 53, 54 of a corresponding (and non-planar shape).

In another modification, the walls 53, 54 may be slightly inclined away from one another as they rise upwardly from the ground so that, although upstanding, they are not truly vertical. In such a case the exposed length of the barrier element 55, although remaining substantially constant, may vary slightly as between its upward, raised condition and its lowered condition. Nevertheless, the effective length of the barrier element between bollards 51, 52 is substantially unchanged in travelling from one condition to the other.

In yet another modification, the barrier element 55 may be provided as a top wire hawser supporting pendant material, e.g. netting, high visibility artificial fabric, flexible chain mail (for instance formed as a tube through which the wire passes), reflective beads, or other pendant material.

In still another modification, the throughway (vehicle roadway or pedestrian pathway) may be provided with a channel 66 (FIG. 1), e.g. cut into the crest of a ramp 67, to accommodate the barrier element 55 in its lowered condition.

Figure 5:
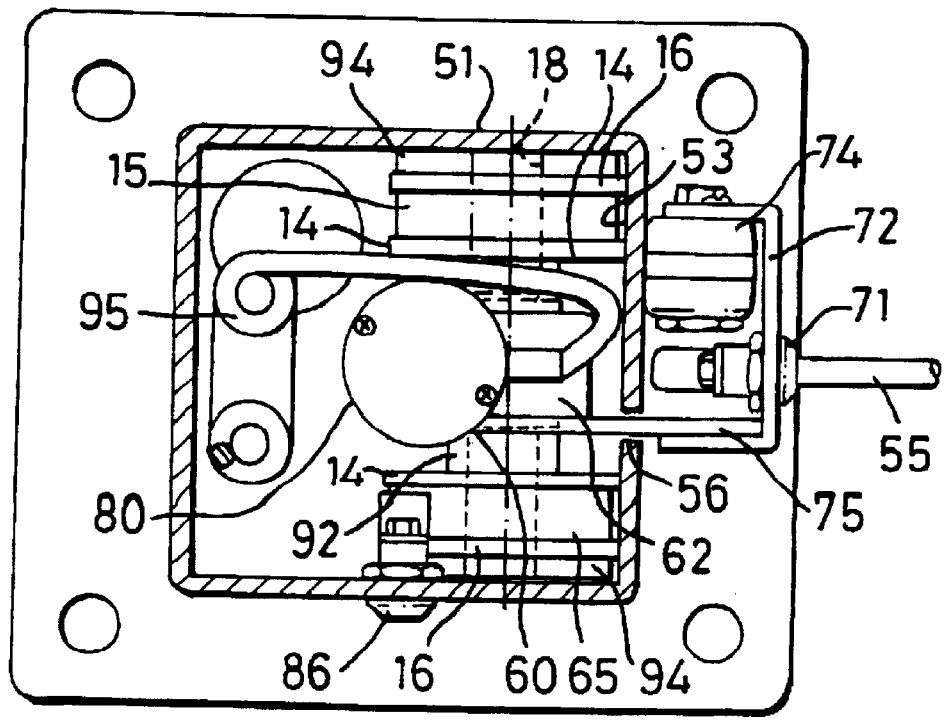
FIG. 5 is an enlarged cross-sectional view on the line V—V of FIG. 4.

In the modification shown in FIGS. 4 and 5 the barrier element 55 does not extend through the slots 56, 57 but instead each of its ends is releasably connected, via a key-operated lock 71, to an external open-backed retention box 72, 73 located against the exterior face of the upright wall 53, 54 of a respective bollard 51, 52. A roller 74 is preferably mounted on each retention box 72 in substantial horizontal alignment with the axis of shaft 17 and to engage the respective and exterior bollard face 53, 54 through the back of each box 72, 73. The two opposite rollers 72 facilitate up and down movement of the opposed retention boxes 72, 73 and of the barrier element 55 strung between them. Such movement results from the up and down movement of the two movable drive devices 60 to which the boxes 72, 73 are firmly and rigidly attached by a respective metal link member 75 that extends through the associated slot 56, 57.

The modified embodiment of FIGS. 4 and 5 also incorporates an alternative counterweighting mechanism to that described above in relation to the embodiment of FIGS. 1 and 2. As shown in FIG. 4, the counterweighting mechanism is provided by a constant force balance spring unit 76 mounted on a bracket 77 located internally of each bollard 51, 52 adjacent its top 78. The bracket 77 also serves to carry an electromagnetic lock 80 which, when energised, retains the associated drive device 60 in its raised uppermost position and thereby maintains the barrier element 55 in its raised position (shown in fall lines in FIG. 4). A lowermost buffer 82 and an electrobrake limit switch 84 are provided at the bottom of each bollard 51, 52 to end downward travel of the devices 60 (and the barrier element 55 extending between them). A key-operated lock 86 is provided in a side wall of each bollard 51, 52 to retain a top cap 88 closing the open upper end 78 of each bollard 51, 52. Opening the lock 86 and disengaging the cap 88 permits access to the interior of the bollards 51, 52 for servicing.

FIG. 5 shows more clearly the pair of motion transmission devices 65 mounted, via brass adapters 18, on the two opposite ends of the output through-shaft 17 of the gearbox 62. The ferrite ring 15 is bounded by the two washers 14, 16 and an idler roller 92 is provided between each side of the casing of gearbox 62 and the adjacent inwards-located washer 14. Similarly a spacer disc 94 of p.t.f.e. is provided between each outward-located washer 16 and the there-adjacent side wall of the bollard/pillar 51, 52. Electric cabling to the motor 61 is shown at 96 in FIG. 5.

Figure 6:
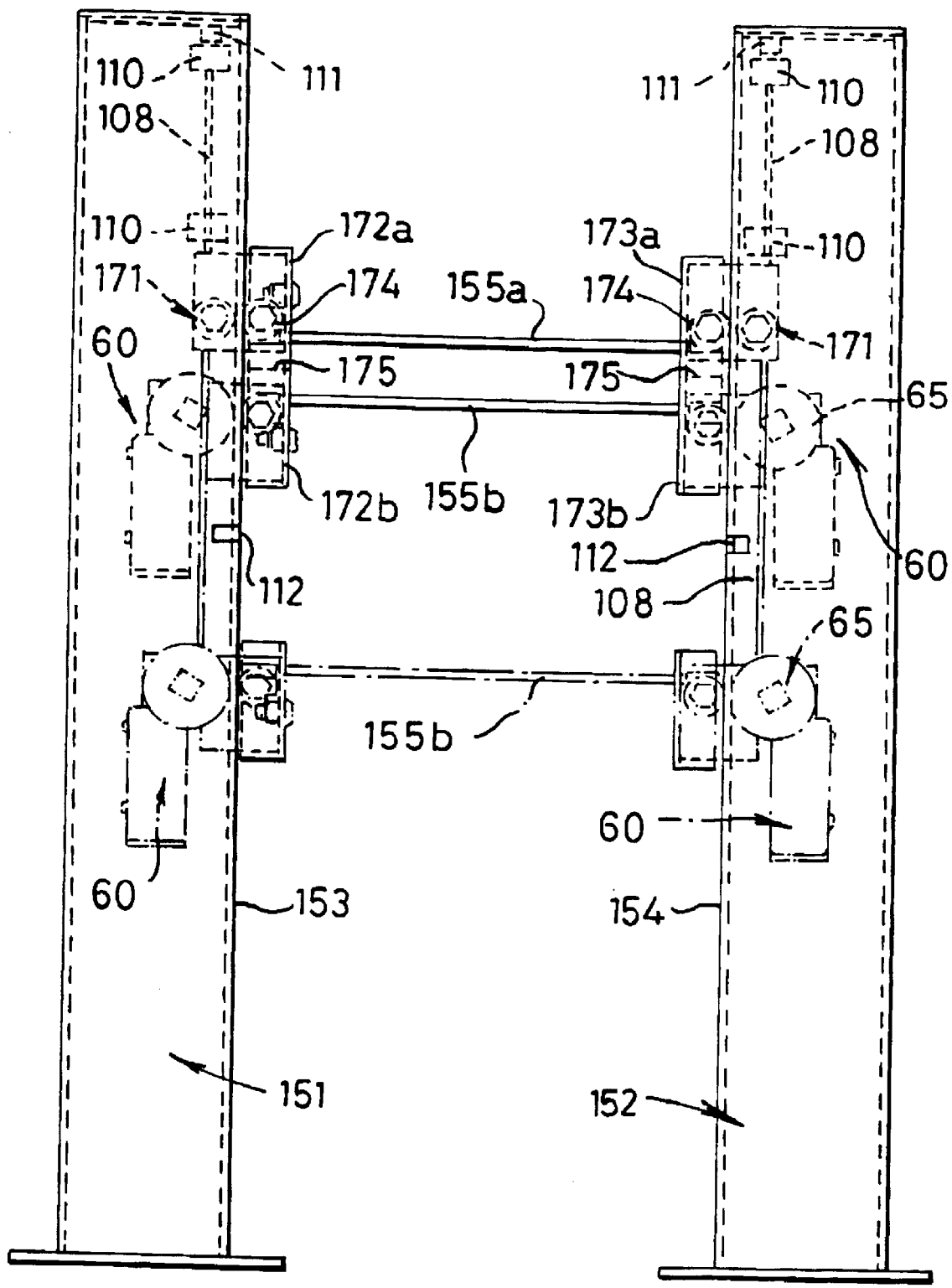
FIG. 6 is a diagrammatic side view of apparatus according to a third embodiment of the invention.

Whereas the above-described and illustrated embodiments provide for the barrier element to be in a raised position to bar passage therethrough and to be lowered to permit passage over the lowered element, the embodiment of FIG. 6 provides for a pair of barrier elements 155a, 155b (e.g. steel cables) to be in parallel in a vertical plane across the opening to be controlled and adopting an above-ground, bottom position to bar passage through the opening but to be raised to an upper position to permit passage beneath the raised elements 155a, 155b (e.g. for use in an in-building car-park, i.e. underground or multi-storey).

To this end the embodiment of FIG. 6 provides a pair of hollow steel bollards or pillars 151, 152 on opposite sides of the opening to be controlled, these pillars 151, 152 being much higher (e.g. with a height of 2.5 mm) than the pillars 51, 52 of FIGS. 1, 2 and 4, 5. The upper barrier element 155a is connected releasably between a pair of open-backed boxlike cable retainer units 172a, 173a mounted rollingly against the external surface of the mutually facing walls 153, 154 of pillars 151, 152. Likewise, the lower barrier element 155b is connected releasably between a pair of open-backed box-like cable retainer units 172b, 173b mounted rollingly against the external surface of the mutually facing walls 153, 154 of pillars 151, 152.

Movable drive devices 60, substantially as described in relation to the previously described embodiments (particularly that of FIGS. 4 and 5), are connected via link members such as 75 (FIGS. 4, 5) to the lower cable retainer units 172b, 173b and to impart up and down motion of drive devices 60 to the barrier element 155b. No such drive devices are coupled to the upper barrier element 155a, its upward and downward motion being derived from the motion of the lower barrier element 155b as will be described below.

Link members similar to 75 are provided to couple the ends of upper barrier element 155a to a non-driven roller assembly 171 located internally of the pillars 151, 152 and providing a rolling reaction to the rollers 174 of the open-backed box-like cable retainer units 172a, 173a to which the ends of the upper barrier element 155a are attached. Each non-driven roller assembly 171 is mounted for vertical guided motion along an upright pole-like guide 108. Upright guide 108 is attached by its lower end to the assembly of the associated drive device 60—such as to travel upwardly and downwardly therewith within the associated pillar 151, 152—and has a dynamic stop member 110 threadedly mounted to its top end, the threaded connection permitting initial fitting of the non-driven roller assembly 171 thereon and subsequent adjustment of the effective length of the sliding link stop provided by the assembly including guide 108 and dynamic stop member 110.

The barrier elements 155a, 155b are free to move vertically up and down the top half of the pillars within certain pre-set limits defied by end stops. Thus, the upper element 155a is restricted in its upward movement by fixed stops 111 attached to the pillars 151, 152 adjacent their top interior, and engageable by the dynamic stop members 110 that move with the upwardly travelling drive units 60. In a somewhat similar manner the upper element 155a is restricted in its downward movement by fixed stops 112 attached to the interior of pillars 151, 152 at a bottom position above the ground, e.g. 700 mm from ground level, which can be engaged by the associated non-driven roller assembly 171 (but past which the downwardly travelling drive units 60 can move without hindrance). In a preferred arrangement, the pair of sliding link stops provided within the pillars 151, 152 by guides 108 and dynamic stop members 110 function constrain the vertical separation of barrier elements 155a, 155b to a predetermined minimum distance apart of e.g. 55 mm and to a predetermined maximum distance apart of e.g. 300 mm.

Thus, when the motors 61 are energised in the sense to raise the barrier, the lower cable 155b is moved upwards (from the lowered position shown in phantom dot-dash outline in FIG. 6) towards the upper cable 155a which, being free to travel in that direction, is carried up with the lower cable 155b due to he mutual abutment at 175 of the upper surface of the box-like cable retainer units 172b, 173b with the lower surface of box-like cable retainer units 172a, 173a. This joint upward motion continues until, in accord with the dimensions of the parts and the pre-setting of the position of end stop 110, the upper surface of each non-driven roller assembly 171 reaches the associated fixed end stop 111 near the top of the pillar 151, 152. At this point, in a preferred arrangement of this embodiment, the barrier elements 155a, 155b are vertically 55 mm apart (as shown in fill lines in FIG. 6) some 2.35 m above ground, freeing the opening to permit passage of vehicles and/or pedestrians below the raised barrier elements 155a, 155b.

When the motors 61 are energised in the opposite sense to reverse the direction of linear travel, the two barrier elements 155a, 155b move downwardly together until downward motion of the upper barrier 155a is arrested by abutment of each non-driven roller assembly 171 with the associated fixed lower stop 112. The lower barrier element 155b can however continue to travel downwards since its drive units 60 can move past this fixed lower stop 112, and therefore the elements 155a, 155b move apart until the sliding link stops are fully extended with the dynamic stop 110 (as shown in broken outline in FIG. 6) resting upon the top of each, already arrested, non-driven roller assembly 171. In a preferred arrangement this movement apart coincides with a spacing of approximately 300 mm between the upper and lower barrier elements 155a, 155b and with the lower barrier element 155b approximately 400 mm from the ground, i.e. with the upper barrier element 155a some 700 mm from the ground and closing off the throughway opening. In a modification reflective fabric or such like may be fastened between the barrier elements when the opening to improve their visibility.

It will be apparent that the above described and illustrated embodiments of this invention (as well as the above-described optional modifications thereto)—which provide one or two barrier elements of substantially non-extending effective length between a pair of bollards or pillars 51, 52 or 151, 152 located one each side of a throughway to be controlled—have a minimal base area or 'footprint' not only when the or each barrier element is stationary in either the raised or lowered condition, but also whilst the or each barrier element is moving between these two conditions.

Other modifications and embodiments of the invention, which will be readily apparent to those skilled in this art, are likewise to be deemed within the ambit and scope of the present invention, and the particular embodiment(s) and modifications hereinbefore described may be varied in construction and detail, e.g. interchanging (where appropriate or desired) different features of each, without departing from the scope of the patent monopoly hereby sought and defined in the following claims.

What is claimed is:

1. Throughway barrier apparatus comprising:
   a pair of housings positioned on each side of a throughway, each housing being provided with a magnetic member susceptible of magnetisation and provided with an upstanding surface;
   a movable device including a magnetic body which is magnetically coupled to the member and which has a cylindrical surface in rolling contact with the upstanding surface; and
   drive means to move the magnetically coupled device upwardly and downwardly of the surface; and further comprising:
      a barrier element to extend across the throughway, the barrier element being in use connected to the two said movable devices for movement therewith.

2. Throughway barrier apparatus according to claim 1, wherein said barrier element is a flexible element.

3. Throughway barrier apparatus according to claim 1, wherein each said movable device and its associated drive means is provided internally of a respective said housing, a wall of each said housing defines said magnetic member and said upstanding surface, an upstanding elongate aperture is provided in each said upstanding surface, and a coupling unit in use connects between an associated said movable device and an adjacent end of the barrier element, said coupling unit including a member to extend through a said upstanding elongate aperture adjacent thereto.

4. Throughway barrier apparatus according to claim 3, wherein said upstanding elongate aperture is a slot.

5. Throughway barrier apparatus according to claim 1, wherein each drive means comprises a motor unit movable together with said movable device.

6. Throughway barrier apparatus according to claim 5, wherein each motor unit has a counterweighting mechanism associated therewith to provide a countering load to at least the weight of the movable motor unit.

7. Throughway barrier apparatus according to claim 5, wherein each said motor unit comprises an electric motor and step-down gear unit.

8. Throughway barrier apparatus according to claim 5, wherein the magnetic body of each said movable device
   (a) has radial end walls at opposed ends of said outer cylindrical surface,
   (b) is magnetically polarised axially of the cylindrical surface, and
   (c) has a disc-like pole plate at each radial end of the cylindrical surface, the two disc-like pole plates having a like diameter greater than the diameter of the cylindrical surface,
and wherein each said motor unit is provided with a drive shaft that is a loose fit within a bore of like cross-sectional shape extending through the magnetic body of said movable device.

9. Throughway barrier apparatus according to claim 8, wherein said drive shaft is of non-circular cross-section.

10. Throughway barrier apparatus according to claim 1, wherein the magnetic body of each said movable device
   (a) has radial end walls at opposed ends of said outer cylindrical surface,
   (b) is magnetically polarised axially of the cylindrical surface, and
   (c) has a disc-like pole plate at each radial end of the cylindrical surface, the two disc-like pole plates having a like diameter greater than the diameter of the cylindrical surface.

* * * * *